United States Patent [19]

Soga et al.

[11] Patent Number: 5,733,834
[45] Date of Patent: Mar. 31, 1998

[54] ORGANIC CARRIER SUPPORTED METALLOCENE CATALYST FOR OLEFIN POLYMERIZATION

[75] Inventors: Gazuo Soga, Ishigawa, Japan; Hyun-joon Kim, Daejun, Rep. of Korea; Sang-kyun Lee, Daejun, Rep. of Korea; Min-chul Jung, Daejun, Rep. of Korea; Byung-hee Son, Daejun, Rep. of Korea; Wuozmi Thosiya, Ishigawa, Japan; Irai Thakhasi, Ishigawa, Japan; Nishida Hiroro, Ishigawa, Japan

[73] Assignee: Samsung General Chemicals Co., Ltd., Chungchungnam-do, Rep. of Korea

[21] Appl. No.: 768,359

[22] Filed: Dec. 17, 1996

Related U.S. Application Data

[62] Division of Ser. No. 585,694, Jan. 16, 1996, Pat. No. 5,610,115.

[30] Foreign Application Priority Data

Jul. 20, 1995 [KR] Rep. of Korea ............ 95-21312
Jul. 20, 1995 [KR] Rep. of Korea ............ 95-21313

[51] Int. Cl.$^6$ .................................................. C08F 4/642
[52] U.S. Cl. .............. 502/117; 502/152; 525/332.2; 525/333.3; 525/360; 525/370; 526/904; 526/943; 526/160; 526/127
[58] Field of Search ................. 525/332.5, 333.3, 525/360, 370; 526/904, 943, 160; 502/152, 117

[56] References Cited

U.S. PATENT DOCUMENTS

| | | | |
|---|---|---|---|
| 4,808,561 | 2/1989 | Welborn, Jr. ............ | 502/104 |
| 4,921,825 | 5/1990 | Kioka et al. ............ | 502/104 |
| 5,122,491 | 6/1992 | Kioka et al. ............ | 502/117 |
| 5,346,925 | 9/1994 | Sugano ............ | 521/54 |
| 5,362,824 | 11/1994 | Furtek et al. ............ | 526/114 |
| 5,492,975 | 2/1996 | Peifer et al. ............ | 575/274 |

OTHER PUBLICATIONS

N.I. Sax et al., eds., "Hawley's Condensed Chemical Dictionary," 11th Ed., Van Nestrand Reinhold, New York, 1987, 1039–1040.

J. March, "Advanced Organic Chemistry," 4th Ed, Wiley, New York, 1992, 534–537.

H.H. Brintzinger et al., Angew. Chem. Int. Ed. Engl., 34, 1143–1147 (1995).

*Primary Examiner*—Mark Nagumo
*Attorney, Agent, or Firm*—Staas & Halsey

[57] ABSTRACT

The organic carrier supported metallocene catalyst of the present invention is prepared by preparing a ligand complex of a silicone compound having at least one halogen, an alkyl group and a cycloalkane dienyl group, activating styrene polymer or styrene/divinylbenzene copolymer with a strong base including a metal atom such as Li, Na, K or Mg, reacting the activated polymer or copolymer with the ligand complex of a silicone compound so that the ligand may be supported on the activated polymer or copolymer, and reacting the organic carrier supported ligand with a compound of a transition metal of Group IVb of the Periodic Table or Lanthanides of Atomic Number 58-71. The styrene polymer or styrene/divinylbenzene copolymer may be alkylated by Friedel-Crafts alkylation before they are activated with a strong base.

2 Claims, No Drawings

5,733,834

1

ORGANIC CARRIER SUPPORTED METALLOCENE CATALYST FOR OLEFIN POLYMERIZATION

This application is a division of application Ser. No. 08/585,694, filed Jan. 16, 1996, now U.S. Pat. No. 5,610,115.

FIELD OF THE INVENTION

The present invention relates to metallocene catalysts for olefin polymerization which are supported on an organic carrier. More particularly, the present invention relates to metallocene catalysts for polymerizing or copolymerizing olefins such as α-olefins, cycloolefins and dienvinyl monomers, which are supported on a styrene/divinyl benzene copolymer as a carrier.

The present invention includes a process for preparing the metallocene catalysts supported on a styrene/divinylbenzene copolymer and a process for polymerizing or copolymerizing olefins using the metallocene catalysts.

BACKGROUND OF THE INVENTION

The polymerization of olefins is well known and has been a widely practiced commercial art for many decades. Catalysts for such polymerization are well known to include Ziegler-Natta type catalysts. In the Ziegler-Natta type catalyst field, the catalyst is usually made up of a transition metal compound such as titanium tetrachloride and an alkyl aluminum as a co-catalyst such as trimethyl or triethyl aluminum However, in order to improve physical properties of polymers of olefins, various researches and developments on catalysts having a high polymerization activity have been carried out. In this regard, metallocene catalysts have been developed, which are superior in polymerization activity and stereoregularity to Ziegler-Natta type catalysts.

U.S. Pat. No. 4,808,561 to Welborn, Jr. discloses an olefin polymerization catalyst comprising the supported reaction product of at least one metallocene of a metal of Group IVb of the Periodic Table and an aluminoxane. The reaction product is formed in the presence of the support which is a porous inorganic metal oxide of Group 2a, 3a, 4a or 4b metal.

U.S. Pat. No. 4,921,825 to Kioka et al. discloses a process for preparing a solid catalyst for olefin polymerization from an aluminoxane, a compound of a transition metal of Group IVb of the Periodic Table and a certain organic or inorganic compound carrier, which comprises contacting a solution of said aluminoxane in a first solvent with a second solvent in which the aluminoxane is insoluble, in the presence of said certain organic or inorganic compound carrier, to deposit said aluminoxane on said certain organic or inorganic compound carrier.

U.S. Pat. No. 5,122,491 discloses a catalyst useful for the polymerization of an olefin prepared from (A) a compound selected from the group consisting of zirconium and hafnium compounds having a ligand including conjugated π electron, (B) an aluminoxane, and (C) an organoaluminum compound.

U.S. Pat. No. 5,362,824 discloses a polymerization catalyst comprising at least one metallocene and at least one aluminoxane dispersed on the surface of a resinous substrate comprising a cross-linked copolymer of about 30% divinyl benzene, about 55% styrene, and about 15% of acetoxy or hydroxy styrene.

2

Typically, homogeneous metallocene catalysts are capable of producing an olefin polymer having a narrow molecular-weight distribution and a stereoregularity. However, the homogeneous metallocene catalysts are disadvantageous in polymer morphology, shape and size of polymer particle, and bulk density. Accordingly, intensive researches are focused on heterogeneous metallocene catalysts for olefin polymerization. Some heterogeneous metallocene catalysts supported on an inorganic carrier such as $SiO_2$, $Al_2O_3$ or $MgCl_2$ have already been developed. In particular, the heterogeneous metallocene catalysts can prepare a polypropylene having high stereoregularity.

In order to provide a metallocene catalyst for preparing an olefin polymer having improved properties, the present inventors have developed a new process for preparing an organic carrier supported metallocene catalyst useful for polymerization of olefins.

OBJECTS OF THE INVENTION

An object of this invention is to provide an organic carrier supported metallocene catalyst for olefin polymerization.

Another object of the invention is to provide a new process for preparing an organic carrier supported metallocene catalyst for olefin polymerization A further object of the invention is to provide an organic carrier supported metallocene catalyst with a good activity for olefin polymerization and a process thereof.

A further object of the invention is to provide a process for preparing olefin polymers with a good molecular-weight distribution, high melting temperature and high stereoregularity using an organic carrier supported metallocene catalyst of this invention There and other objects and advantages may be found in various embodiments of the present invention. It is not necessary that each and every object or advantage be found in all embodiments of the present invention. It is sufficient that the present invention may be advantageously employed.

Other objects and advantages of this invention will be apparent from the ensuing disclosure and appended claims.

SUMMARY OF THE INVENTION

The organic carrier supported metallocene catalyst according to the present invention is prepared by preparing a ligand complex for supporting on an organic carrier, activating an organic carrier through ionization with a strong base, reacting the activated organic carrier with the ligand complex, and reacting the resulting product with a metal compound.

More particularly, the organic carrier supported metallocene catalyst of the present invention is prepared by preparing a ligand complex of a silicon compound having at least one halogen, an alkyl group and a cycloalkane dienyl group, activating styrene polymer or styrene/divinylbenzene copolymer with a strong base including a metal atom such as Li, Na, K or Mg, reacting the activated polymer or copolymer with the ligand complex of a silicon compound so that the ligand may be supported on the activated polymer or copolymer, and reacting the organic carrier supported ligand with a compound of a transition metal of Group IVb of the Periodic Table or Lanthanides of Atomic Number 58-71. The styrene polymer or styrene/divinylbenzene copolymer may be alkylated by Friedel-Crafts alkylation before they are activated with a strong base.

In the process for preparing the organic carrier supported metallocene catalyst, an alkylene bonded cycloalkanediene can be used as a ligand complex substituting a silicon compound. In this case, the styrene polymer or styrene/divinylbenzene copolymer is activated with a halogenated alkyl ether.

DETAILED DESCRIPTION OF THE INVENTION

The organic carrier supported metallocene catalyst according to the present invention is prepared in the following manner.

First, a ligand complex for supporting on an organic carrier is prepared. An exemplary ligand complex is a silicon compound having at least one halogen, an alkyl group and a cycloalkane dienyl group, represented by the general formula(I):

wherein A is a halogen or a lower alkyl of $C_1-C_6$, X is halogen, a lower alkoxy of $C_1-C_6$ or a phenoxy, and M and N are selected from the group consisting of cyclopentadienyl, indenyl, fluorenyl, alkyl-substituted indenyl, and alkyl-substituted fluorenyl, and can be the same or different from each other.

The ligand complex may be prepared by reacting a silicon compound having halogen and/or alkyl group with a cycloalkanediene. The ligand complex can be easily prepared by those skilled in the art.

Exemplary cycloalkanedienes for preparing the ligand complex are cyclopentadiene, indene and fluorene. Exemplary silicon compounds for preparing the ligand complex are tetrachlorosilane and 1-methyltrichlorosilane.

In order to prepare the ligand complex of general formula (I), a cycloalkanediene is reacted in a solvent with an organometal compound so as to make the cycloalkanediene be in a salt state, then to the resultant is added a silicon compound.

In the present invention, an organic carrier is employed to support a ligand complex. In order for a ligand complex to be supported on an organic carrier, the organic carrier is activated through ionization with strong base. The exemplary organic carriers useful in this invention are styrene polymer and styrene/divinylbenzene copolymer. Preferable, styrene/divinylbenzene copolymer containing 2 to 5% by weight of divinylbenzene may be used as organic carrier. The strong base includes a metal atom of Li, Na, K or Mg. The activation of an organic carrier with a strong base is carried out by ionization of the organic carrier with an organometal compound and other additives. By activation, the organic carrier becomes an polymer-metal salt state.

As an embodiment of this invention, the styrene polymer and styrene/divinylbenzene copolymer may be alkylated by Friedel-Crafts alkylation before they are activated with a strong base. In this embodiment, the benzene ring of the styrene polymer or styrene/divinylbenzene copolymer is alkylated by Friedel-Crafts alkylation.

An organic carrier supported ligand complex is prepared by reacting the activated styrene polymer or styrene/divinylbenzene copolymer with the ligand complex of a silicon compound, wherein a ligand is supported on an organic carrier first.

Then, the organic carrier supported ligand complex is reacted with a compound of a transition metal of Group IVb of the Periodic Table or Lanthanides of Atomic Number 58-71, finally providing an organic carrier supported metallocene catalyst according to the present invention.

In case of A and X in general formula(I) being halogens, a metallocene catalyst represented by following formula(II a) may be obtained. In case of A being a lower alkyl of $C_1-C_6$, a metallocene catalyst represented by formula(II b) may be obtained. And, in case of A being a lower alkyl of $C_1-C_6$ and an organic carrier being alkylated by Friedel-Crafts alkylation, a metallocene catalyst of formula(II c) may be obtained:

(IIa)

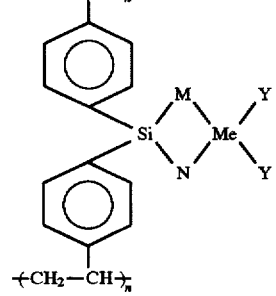

(IIb)

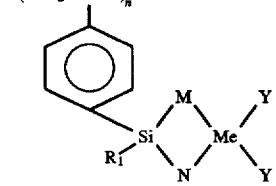

(IIc)

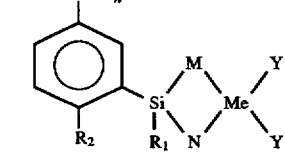

wherein $R_1$ and $R_2$ are an alkyl of $C_1-C_6$ and are the same or different from each other, M and N are a cyclopentadienyl, an indenyl, a fluorenyl, an alkyl-substituted indenyl or an alkyl-substituted fluorenyl and are the same or different from each other, Me is a transition metal of Group IVb or Lanthanides, and Y is a halogen, a lower alkyl of $C_1-C_6$ or a phenoxy.

In a preferable metallocene catalyst represented by formula(II a), Me is zirconium, M and N are all indenyl, and Y is chlorine.

In a preferable metallocene catalyst represented by formula(II b), Me is zirconium, M and N are all indenyl, $R_1$ is methyl, and Y is chlorine.

In a preferable metallocene catalyst represented by formula(II c), Me is zirconium, M and N are all indenyl, $R_1$ is methyl, $R_2$ is isopropyl, and Y is chlorine.

As another type of a ligand complex in accordance with the present invention, an alkylene bonded cycloalkanediene can be employed substituting a silicone compound, which is represented by the following general formula(III):

wherein M and N are selected from the group consisting of cyclopentadienyl, indenyl, fluorenyl, alkyl-substituted indenyl and alkyl-substituted fluorenyl, and can be the same or different from each other, and n is an integer of 2-4.

In the process using an alkylene bonded cycloalkanediene as ligand complex, the organic carrier is activated with a halogenated alkyl ether through alkylation. Exemplary alkylene bonded cycloalkanediene is chloroethylmethylether.

The activated organic carrier is reacted with the alkylene bonded cycloalkanediene so that the ligand may be supported on the carrier. Then, the organic carrier supported ligand is reacted with a compound of a transition metal of Group IVb of the Periodic Table or Lanthanides of Atomic Number 58-71, finally providing an organic carrier supported metallocene catalyst represented by the following general formula(IV):

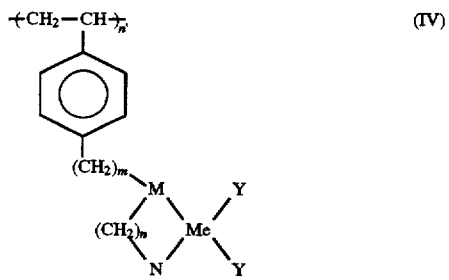

wherein M and N are selected from the group consisting of cyclopentadienyl, indenyl, fluorenyl, alkyl-substituted indenyl and alkyl-substituted fluorenyl, and can be the same or different from each other, Me is a transition metal of Group IVb or Lanthanides, Y is a halogen, a lower alkyl of $C_1$–$C_6$ or a phenoxy, m is an integer of 1–3, n is an integer of 2–4, and n' is an integer.

In a preferable metallocene catalyst represented by the general formula(IV), Me is zirconium, M and N are all indenyl, Y is chlorine, m is 1, and n and n' are 2.

When an organic carrier supported metallocene catalyst is used for polymerization of olefins, an alkylaluminoxane is employed together as co-catalyst. Exemplary alkylaluminoxane is methylaluminoxane (MAO). The co-catalyst is used in the amount of 5 to 2,000 moles per one mole of the metallocene catalyst. Preferably, 50 to 2,000 moles of the co-catalyst may be used.

Polymers or copolymers of olefins such as α-olefins, cycloolefins and dienvinyl monomers can be prepared using an organic carrier supported metallocene catalyst according to the present invention.

The invention may be better understood by reference to the following examples which are intended for purposes of illustration and are not to be construed as in any way limiting the scope of the present invention, which is defined in the claims appended hereto.

EXAMPLES

Example 1

Preparation of Ligand: Lithium indenylide was prepared by adding 25 g of indene to 100 g of toluene, and reacting the resultant with 37 g of n-butyllithium at −50° C. for 12 hours. Bisindenyldichlorosilane was prepared by reacting the resultant with 13 g of tetrachlorosilane at room temperature for 5 hours.

Activation of Carrier: 50 g of styrene/divinylbenzene copolymer(weight average molecular weight: 150,000) containing 5% by weight of divinylbenzene was activated with 100 g of toluene, 6 g of n-butyllithium and 0.5 g of tetramethylethyleneamine(TMEDA) at −50° C. for 12 hours.

Synthesis of Metallocene Catalyst: The ligand was reacted with the activated organic carrier. To 100 g of the reacting product was added 500 g of tetrahydrofuran, and 86 g of n-butyllithium was added dropwise −50° C. over 8 hours. The resultant was purified by filtration, and 500 g of tetrahydrofuran and 75 g of tetrachloro-zirconium were added at room temperature for 12 hours. The metallocene catalyst of general formula(II a) described above was obtained.

Polymerization: Propylene was polymerized using a glass reactor equipped with a temperature controlled apparatus, a magnetic agitator and valves for supplying monomers and nitrogen. 300 ml of a purified toluene, 1 mmole of methylaluminoxane(MAO), and 100 mg of the metallocene catalyst prepared above were put into a nitrogen-substituted reactor and mixed, and propylene was added up to the reaction pressure. The polymerization of propylene was carried out at 40° C. for 6 hours. The polymerization was terminated by adding 50 ml of $HCl/C_2H_5OH$ solution. The resultant was purified six times with methanol over 12 hours. The polymer was vacuum-dried at 60° C. for 24 hours.

Copolymerization: The same reactor as in the polymerization above was utilized. 300 ml of a purified toluene, 5 ml of MAO, and 100 mg of the metallocene catalyst prepared above were put into a nitrogen-substituted reactor and mixed, and 13.46 mmole of propylene was added. Then ethylene was added up to the reaction pressure of 3 atm. The copolymerization of propylene and ethylene was carried out at 70° C. for 6 hours. The copolymerization was terminated by adding 50 ml of $HCl/C_2H_5OH$ solution. The resultant was purified six times with methanol over 12 hours. The copolymer was vacuum-dried at 60° C. for 24 hours.

Example 2

Example 2 was performed as in Example 1 with the exception that 16 g of 1-methyltrichlorosilane was substituted for the 13 g of tetrachlorosilane of Example 1. In this Example 2, the metallocene catalyst of general formula(II b) described above was prepared.

Example 3

Example 3 was performed as in Example 1 with the exception that 100 g of styrene/divinylbenzene copolymer (weight average molecular weight: 150,000) containing 5% by weight of divinylbenzene was alkylated by Friedel-Crafts alkylation with monochloroisopropane and trichloroaluminum in 500 g of toluene before the copolymer was activated with n-butyllithium and tetramethylethylamine(TMEDA). In this Example 3, the metallocene catalyst of general formula(I/c) described above was prepared.

Example 4

Activation of Carrier: 50 g of styrene/divinylbenzene copolymer(weight average molecular weight: 150,000) containing 5% by weight of divinylbenzene was activated with 34 g of tetrachlorotin and 26 g of chloroethylmethylether in 500 g of chloroform at −30° C. for 8 hours.

Preparation of Ligand and Metallocene Catalyst: 200 g of toluene and 62 g of n-butyllithium were added to 47 g of diindenyl ethylene at −50° C. for 8 hours. The ligand of diindenyl ethylene was obtained. The ligand was reacted with the activated organic carrier. To the resultant was added 200 g of tetrahydrofuran and tetrachlorozirconium at 60° C. for 5 hours. The metallocene catalyst of general formula(IV) described above was prepared.

Polymerization: Propylene was polymerized using a glass reactor equipped with a temperature controlled apparatus, a magnetic agitator and valves for supplying monomers and nitrogen. 300 ml of a purified toluene, 50 mmole of methylaluminoxane(MAO), and 200 mg of the metallocene catalyst prepared above were put into a nitrogen-substituted reactor and mixed, and propylene was added up to the reaction pressure. The polymerization of propylene was carried out at G0° C. for 10 hours. The polymerization was terminated by adding 50 ml of $HCl/C_2H_5OH$ solution. The resultant was purified six times with methanol over 12 hours. The polymer was vacuum-dried at 60° C. for 24 hours.

Copolymerization: The same reactor as in the polymerization above was utilized. 300 ml of a purified toluene, 5 ml of MAO, and 0.09 g of the metallocene catalyst prepared above were put into a nitrogen-substituted reactor and mixed, and 13.46 mmole of propylene was added. Then ethylene was added up to the reaction pressure of 3 atm. The copolymerization of propylene and ethylene was carried out at 70° C. for 6 hours. The copolymerization was terminated by adding 50 ml of $HCl/C_2H_5OH$ solution. The resultant was purified six times with methanol over 12 hours. The copolymer was vacuum-dried at 60° C. for 24 hours.

Comparative Examples

The following comparative Examples 1–4 are to compare with Examples 1–4 in accordance with the present invention Comparative Example 1

Catalyst: A metallocene catalyst excluding the organic carrier from the catalyst of general formula(II a) was prepared.

Carrier Supporting: Dry silica(Davison Grade 952) was dispersed in toluene at 600° C. for 10 hours. To the dispersed solution was added the metallocene catalyst which was solved in toluene. The resultant was maintained to react at 70° C. for 15 hours, then washed with toluene. The silica supported metallocene catalyst was prepared.

Polymerization and Copolymerization: Polymerization and copolymerization were performed as in Example 1, except that the silica supported metallocene catalyst prepared above was employed.

Comparative Example 2

Catalyst: A metallocene catalyst excluding the organic carrier from the catalyst of general formula(II b) was prepared.

Carrier supporting: Dry silica(Davison Grade 952) was dispersed in toluene at 600° C. for 10 hours. To the dispersed solution was added the metallocene catalyst which was solved in toluene. The resultant was maintained to react at 70° C. for 15 hours, then washed with toluene. The silica supported metallocene catalyst was prepared.

Polymerization and Copolymerization: Polymerization and copolymerization were performed as in Example 2, except that the silica supported metallocene catalyst prepared above was employed.

Comparative Example 3

Catalyst: A metallocene catalyst excluding the organic carrier from the catalyst of general formula(II c) was prepared.

Carrier Supporting: Dry silica(Davison Grade 952) was dispersed in toluene at 600° C. for 10 hours. To the dispersed solution was added the metallocene catalyst which was solved in toluene. The resultant was maintained to react at 70° C. for 15 hours, then washed with toluene. The silica supported metallocene catalyst was prepared.

Polymerization and Copolymerization: Polymerization and copolymerization were performed as in Example 3, except that the silica supported metallocene catalyst prepared above was employed.

Comparative Example 4

Catalyst: A metallocene catalyst excluding the organic carrier from the catalyst of general formula(IV) was prepared.

Carrier Supporting: Dry silica(Davison Grade 952) was dispersed in toluene at 600° C. for 10 hours. To the dispersed solution was added the metallocene catalyst which was solved in toluene. The resultant was maintained to react at 70° C. for 15 hours, then washed with toluene. The silica supported metallocene catalyst was prepared.

Polymerization and Copolymerization: Polymerization and copolymerization were performed as in Example 4, except that the silica supported metallocene catalyst prepared above was employed.

The following Table 1 sets forth the results of polymerization of propylene in accordance with Examples 1–3 and comparative Examples 1–3.

TABLE 1

|  |  | Zirconium Content (× 10 mmol-Zr/g) | Catalyst Yield (g) | Catalyst Activity (Kg-PP/ mol-Zr · h) | MW (× 10$^4$) | Tm (°C.) |
|---|---|---|---|---|---|---|
| Examples | 1 | 5.5 | 1.64 | 497 | 2.3 | 139.9 |
|  | 2 | 7.1 | 1.54 | 150 | 2.7 | 138 |
|  | 3 | 17.1 | 1.76 | 72 | 2.6 | 138.5 |
| Comparative | 1 | 5.1 | 1.11 | 210 | 1.1 | 133.8 |
| Examples | 2 | 4.2 | 0.92 | 60 | 0.8 | 133.5 |
|  | 3 | 3.8 | 0.78 | 35 | 0.5 | 132.4 |

The following Table 2 sets forth the results of copolymerization of ethylene/propylene in accordance with Examples 1–3 and comparative Examples 1–3.

TABLE 2

|  |  | Catalyst Content (g) | Co-Catalyst Content (MAO, ml) | C2[1] (atm) | C3[2] (mmol) | Catalyst Yield (g) | Catalyst activity[3] | MWD[4] | MW | Tm (°C.) | I.I.[5] (%) |
|---|---|---|---|---|---|---|---|---|---|---|---|
| Examples | 1 | 0.09 | 5 | 3 | 13.46 | 2.18 | 49,800 | 2.0 | 124,300 | 136.9 | 81.9 |
|  | 2 | 0.66 | 5 | 3 | 9.52 | 1.86 | 36,900 | 3.1 | 98,000 | 139.7 | 88.4 |
|  | 3 | 0.32 | 5 | 3 | 12.57 | 3.02 | 54,000 | 3.4 | 85,000 | 137.9 | 82.6 |
| Comparative | 1 | 0.51 | 5 | 3 | 8.14 | 1.02 | 21,100 | 3.8 | 54,000 | 134.2 | 80.1 |
| Examples | 2 | 0.38 | 5 | 3 | 9.22 | 1.23 | 18,700 | 4.1 | 39,000 | 133.4 | 82.3 |
|  | 3 | 0.65 | 5 | 3 | 10.54 | 0.98 | 12,400 | 4.2 | 48,000 | 132.1 | 82.4 |

Notes;
[1] Pressure of ethylene
[2] mmoles of propylene
[3] Kg-Polymer/mol-Zr-hr
[4] Molecular Weight Distribution
[5] Isotactic Index The following Table 3 sets forth the results of polymerization of propylene in accordance with Example 4 and Comparative Example 4.

TABLE 3

|  | Zirconium Content ($\times 10^3$ mmol-Zr/g) | Catalyst Yield (g) | Catalyst Activity (Kg-PP/ mol-Zr · h) | MW ($\times 10^4$) | Tm (°C.) |
|---|---|---|---|---|---|
| Examples 4 | 8.4 | 1.33 | 650 | 2.5 | 138.4 |
| Comparative Examples 4 | 6.1 | 0.87 | 330 | 1.8 | 136.7 |

The following Table 4 sets forth the results of copolymerization of ethylene/propylene in accordance with Example 4 and Comparative Example 4.

TABLE 4

|  | Catalyst Content (g) | Co-Catalyst Content (MAO, ml) | C2[1] (atm) | C3[2] (mmol) | Catalyst yield (g) | Catalyst activity[3] | MWD[4] | MW | Tm (°C.) | I.I.[5] (%) |
|---|---|---|---|---|---|---|---|---|---|---|
| Examples 4 | 0.69 | 5 | 3 | 24.5 | 2.89 | 43,000 | 2.8 | 93,000 | 138.4 | 83.5 |
| Comparative Examples 4 | 0.69 | 5 | 3 | 25 | 2.05 | 38,000 | 3.2 | 72,000 | 136.1 | 82.2 |

Notes;
[1] Pressure of ethylene
[2] mmoles of propylene
[3] Kg-Polymer/mol-Zr-hr
[4] Molecular Weight Distribution
[5] Isotactic Index In Tables 1–4, metal content, catalyst activity and melting point(Tin) were measured as the following methods.

Metal Content: 0.5 g of metallocene catalyst was dissolved in nitric acid, and the resultant was diluted with water. A test solution was obtained. The zirconium content was measured using an Inductively Coupled Plasma Spectrophotometer(ICP).

Catalyst Activity: The catalyst activity was obtained in Kg-Polymer/mol-Zr-atm by measuring weight of polymer prepared by polymerization.

Melting Point: The melting point was obtained using Du Pont 2000 System(DSC) under nitrogen atmosphere with an aluminum pan of 6 mg of polymer. The temperature rate was 10° C./min.

Further modifications of the invention will be apparent to those skilled in the art and all such modifications are deemed to be with the scope of the invention as defined in the following claims.

What is claimed is:

1. An organic carrier supported metallocene catalyst for olefin polymerization represented by the general formula (IIa):

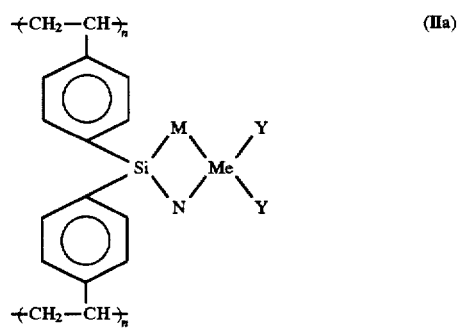

wherein M and N are selected from the group consisting of cyclopentadienyl, indenyl, fluorenyl, alkyl-substituted indenyl, and alkyl-substituted fluorenyl and are the same or different from each other, Me is a transition metal of Group IVb of the Periodic Table or Lanthanides, and Y is a halogen, a lower alkyl of $C_1$–$C_6$ or phenoxy, prepared by a process comprising:

preparing a ligand complex of a silicon compound having at least one halogen, an alkyl group and a cycloalkane-dienyl group, represented by the general formula (I):

wherein A is a halogen or a lower alkyl off $C_1$–$C_6$, X is a halogen, or a phenoxy, and M and N are selected from the group consisting of cyclopentadienyl, indenyl, fluorenyl, alkyl-substituted indenyl, and alkyl-substituted fluorenyl, and are the same or different from each other;

activating an organic carrier with a strong base containing a metal atom selected from the group consisting of Li, Na, K and Mg, wherein said organic carrier is a styrene polymer;

reacting said activated organic carrier with said ligand complex of a silicon compound in a base so that said ligand is supported to said activated organic carrier; and reacting said organic carrier supported ligand with a compound of a transition metal of Group IVb of the Periodic Table or Lanthanides of Atomic Number 58-71, and further comprising an activator.

2. An organic carrier supported metallocene catalyst for olefin polymerization represented by the general formula (IV):

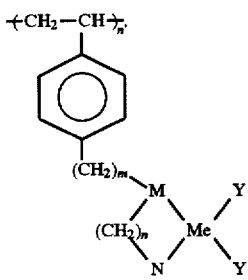
(IV)

wherein M and N are selected from the group consisting of cyclopentadienyl, indenyl, fluorenyl, alkyl-substituted indenyl, and alkyl-substituted fluorenyl, and are the same or different from each other, Me is a transition metal of Group IVb of the Periodic Table, or Lanthanides, and Y is a halogen, a lower alkyl of $C_1$–$C_6$ or a or phenoxy, m is an integer of 1–3, n is an integer of 2–4, and n' is an integer, prepared by a process comprising:

preparing a ligand complex of an alkylene bonded cycloalkanediene represented by the general formula (III):

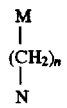
(III)

wherein M and N are selected from the group consisting of cyclopentadienyl, indenyl, fluorenyl, alkyl-substituted indenyl, and alkyl-substituted fluorenyl and are the same or different from each other;

activating an organic carrier with a halogenated alkyl ether in a Lewis acid, wherein said organic carrier is a styrene polymer;

reacting said activated organic carrier with said ligand complex of an alkylene bonded cycloalkanediene in a strong base so that said ligand is supported to said activated organic carrier; and reacting said organic carrier supported ligand with a compound of a transition metal of Group IVb of the Periodic Table or Lanthanides of Atomic Number 58-71, and further comprising an activator.

\* \* \* \* \*